United States Patent [19]

Bernot et al.

[11] Patent Number: 5,757,608
[45] Date of Patent: May 26, 1998

[54] COMPENSATED PRESSURE TRANSDUCER

[75] Inventors: Anthony J. Bernot, Gilbert; William H. McCormack, Tucson, both of Ariz.; Pingyu Liu, Indianapolis, Ind.

[73] Assignee: AlliedSignal Inc., Morris Township, N.J.

[21] Appl. No.: 788,067

[22] Filed: Jan. 23, 1997

Related U.S. Application Data

[60] Provisional application No. 60/011,049 Jan. 25, 1996.

[51] Int. Cl.⁶ .................... H01G 7/00; G01L 9/12
[52] U.S. Cl. .................... 361/283.4; 73/718; 73/724
[58] Field of Search ............... 361/283.1, 283.3, 361/283.4; 73/715, 718, 724

[56] References Cited

U.S. PATENT DOCUMENTS

| | | |
|---|---|---|
| 3,645,137 | 2/1972 | Hazen . |
| 4,073,191 | 2/1978 | Saigusa . |
| 4,370,890 | 2/1983 | Frick . |
| 4,422,125 | 12/1983 | Antonazzi et al. . |
| 4,479,070 | 10/1984 | Frische et al. . |
| 4,680,971 | 7/1987 | Kavli et al. . |
| 4,689,999 | 9/1987 | Shkedi . |
| 4,735,098 | 4/1988 | Kavli et al. . |
| 4,798,089 | 1/1989 | Frick et al. . |
| 4,879,627 | 11/1989 | Grantham ............... 361/283 |
| 4,949,581 | 8/1990 | Rud, Jr. ............... 73/706 |
| 4,987,782 | 1/1991 | Shkedi et al. . |
| 4,996,627 | 2/1991 | Zias et al. ............... 361/283 |
| 5,157,973 | 10/1992 | Ciminelli ............... 73/718 |
| 5,189,591 | 2/1993 | Bernot . |
| 5,515,732 | 5/1996 | Willcox et al. ............... 73/724 |

Primary Examiner—Bot L. Ledynh
Attorney, Agent, or Firm—Jerry J. Holden

[57] ABSTRACT

The capacitance type pressure transducer is disclosed which includes an isolation additional diaphragm made of the same material as the operative diaphragms the transducer. Material may be quartz, silicon, or aluminosilicate. The isolation diaphragm minimizes deflections of the operative diaphragms as the housing base is bowed due to the pressure differential between the internal reference pressure of the capsule and the ambient pressure. The transducer may be configured to measure an absolute pressure or a differential pressure.

10 Claims, 2 Drawing Sheets

COMPENSATED PRESSURE TRANSDUCER

REFERENCE TO COPENDING APPLICATION

This application claims the benefit of U.S. Provisional Application No. 60/011,049, filed Jan. 25, 1996.

TECHNICAL FIELD

This invention relates to capacitive pressure transducers and more particularly to an improved pressure transducer resistant to pressure differentials across the housing or case of the transducer.

BACKGROUND OF THE INVENTION

Pressure transducers of the quartz capacitive type (U.S. Pat. No. 4,422,125 incorporated herein by reference) or the aluminosilicate glass type (U.S. Pat. No. 5,189,591 incorporated herein by reference) have advantageously been used in many highly accurate pressure measuring systems. Their relatively low temperature coefficient of expansion, nearly nonexistent hysteresis characteristics, and mechanical ruggedness all lend themselves to applications where other transducers would experience high rates of failure such as on aircraft.

Prior art pressure transducers of the type related to the present invention are illustrated in FIG. 1 and U.S. Pat. Nos. 4,689,999 and 4,987,782 which are incorporated herein by reference. Referring to FIG. 1, the pressure transducer includes a housing 1 having an pressure inlet port 2 and tube portion 3. Carried within the housing 1 is a quartz capsule 4. Within the capsule 4 are a pressure diaphragm 6, an acceleration diaphragm 7, each having electrodes. Conducting wires 9 carry the signal from the electrodes, through the housing 1. The capsule 4 is mounted on quartz stem 10 which is bonded to the inner surface of the tube portion 3 by a polyurethane adhesive. The quartz stem 10 isolates the capsule 4 from changes in the pressure differential between the inside of the housing 1 and the ambient pressure outside. That is, as the housing deflects either towards the capsule or away from the capsule due to this case pressure differential, the stem isolates the capsule from these deflections so that the deflections at the pressure and acceleration diaphragms are negligible. The effect of these housing deflections on the diaphragms is commonly referred to as case pressure sensitivity.

There are a number of disadvantages associated with the use of the fused stem. The stem is mounted to a hole in a printed circuit board. Because of its shape, other components cannot be mounted on the board below the housing. This creates unusable circuit board space which increases costs. The housing must be manufactured to accommodate the stem also increasing costs. Further, parasitic capacitance and electrical leakage across the exposed connections can vary in the presence of moisture or other contaminants vary in the pressure medium.

Accordingly, there is a need for means for mounting the capsule within the housing that overcome the disadvantages of the fused stem while having the same case pressure sensitivity.

SUMMARY OF THE INVENTION

The capacitance type pressure transducer of the present invention, whether capable of measuring absolute and differential pressure, including an additional plate of the same material as the operative plates of the transducer. Material may be quartz or silicon as referenced in the above mentioned two patents, or aluminosilicate as discussed in U.S. Pat. No. 5,189,591 incorporated by reference herein. The additional plate also referred to as an isolation diaphragm minimizes deflections of the quartz or aluminosilicate capsule diaphragms as the housing base is bowed due to the pressure differential between the internal reference pressure of the capsule and the ambient pressure. The isolation diaphragm may be bonded to the capsule by a $CO_2$ laser, by a metal diffusion bonding, or by a glass frit.

The invention described herein therefore makes use of a design which has minimal case pressure sensitivity and is also insensitive to contaminants in the pressure medium. The only portions of the capsule exposed to the pressure medium are guard film deposits on the capsule, and mounting adhesive.

DESCRIPTION OF THE PREFERRED EMBODIMENT

Figure 2:
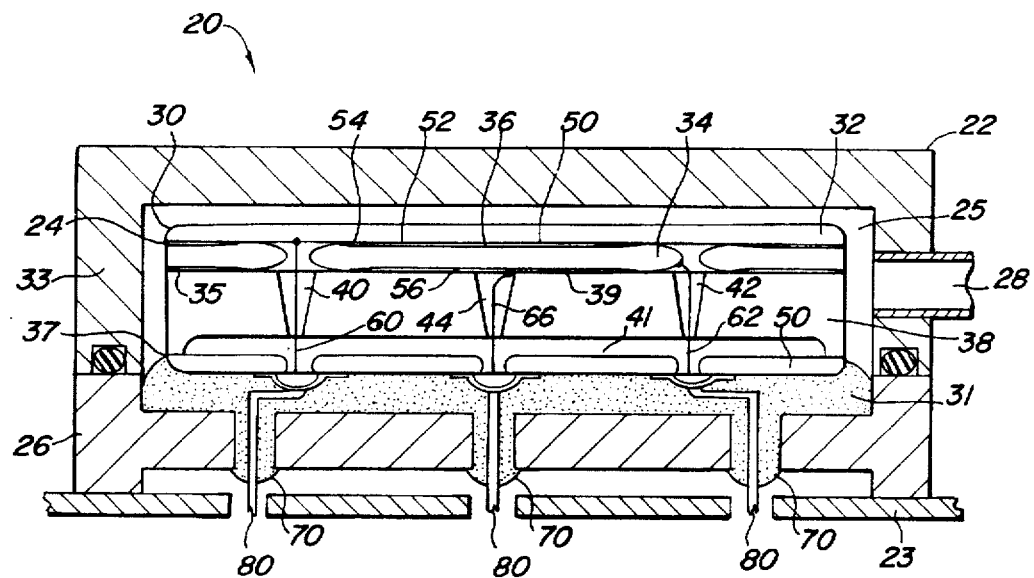
FIG. 2 is an elevational cross-sectional view of an absolute pressure transducer constructed in accordance with the principles of the present invention.

Referring to FIG. 2, a pressure compensated pressure transducer 20 has a two part housing 22 having a upper portion 24 and a base portion 26 that define an interior chamber 25. The two portions 24, 26 are sealed together with an o-ring or alternatively they can be glued together. The housing 22 has a pressure inlet port 28 that is in fluid communication with a source of fluid pressure to be measured and the chamber 25. In a manner familiar to those skilled in the art, the base portion 26 is mounted to a printed circuit board 23.

Carried within the chamber 25 and spaced from the housing 22 is a quartz capsule generally referenced by numeral 30. Though the following description is made with reference to the components being quartz, it should it be understood that other materials such as aluminosilicate or silicon can be used. The quartz capsule 30 sits on a layer 31 of a resilient silicone material that is disposed in the base portion 26 of the housing 22. The quartz capsule 30 comprises a quartz pressure diaphragm 32, a quartz acceleration diaphragm 34, a quartz support member 38, and a quartz isolation diaphragm 50. To form the capsule 30, diaphragms 32 and 34 are fused at their periphery as shown by reference numeral 33 to define a space 36 therebetween. Likewise, the periphery of diaphragm 34 is fused to the periphery of the quartz support member 38 at location 35 to define a space 39 therebetween. Finally, to complete the structure of the quartz capsule 30, at location 37 the periphery of support member 38 is fused to the periphery of the isolation diaphragm 50 to define a space 41 therebetween. The fusing of these components can be accomplished with $CO_2$ laser or by welding, or metal diffusion bonding or glass frit. For convenience of fabrication, it is preferable that the diaphragms 32, 34, support member 38, and isolation diaphragm 50 be of a circular configuration, though other configurations such as square will also work.

The pressure diaphragm 32 and acceleration diaphragm 34 have metal electrodes evenly deposited on both sides thereof that do not extend to the edges of the diaphragms. The metal electrodes are made of a noble metal such as gold. The pressure diaphragm 32 has an electrode 50 deposited on its surface facing the acceleration diaphragm 34 and an electrode 52 on its opposite surface. Similarly, the acceleration diaphragm 34 has deposited a metal electrode 54 on its side facing diaphragm 32 and a metal electrode 56 on its other side. The electrodes 52 and 56 are used to ensure that the diaphragm 32 and 34 respectively will not bend when subjected to heating or cooling due to unequal expansion that can occur when only one side has an electrode. These electrode 52, 56 are also referred to as a ground shields.

Two passageways, 40 and 42 extend from the pressure diaphragm 32 through the capsule 30. A conductor wire 60 is connected to the electrode 54 and extends through passage way 40. A second conductor wire 62 is connected to electrode 54 and extends through passageway 42. An optional third passageway 44 extends from acceleration diaphragm 34 through the capsule 30. The passageways 40, 42 and 44 are capped by seals 70. A conductor wire 66 is ultrasonic wire bonded to the quartz support member 38 and extends through the passageway 44. Capacitor terminals 80 carry the signals from the wires 40, 42, 66 out of the housing 10, and through the circuit board 23.

Figure 3:
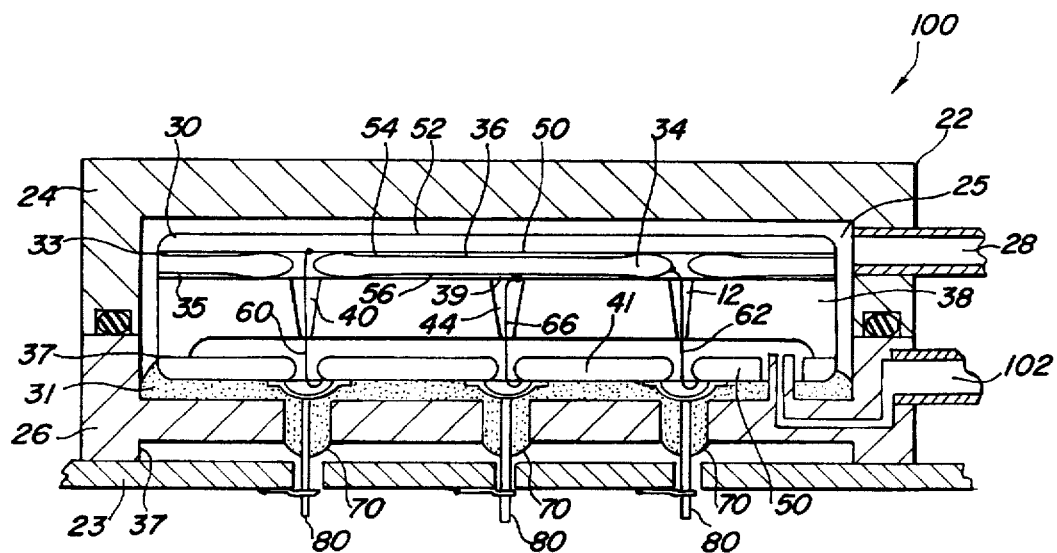
FIG. 3 is an elevational cross-sectional view of a differential pressure transducer constructed in accordance with the principles of the present invention.

FIG. 3 shows a differential pressure transducer 100. The transducer 100 is essentially identical to the pressure transducer 20 except that a second port 102 delivers a reference pressure to the space 41. This type of transducer is used to measure a pressure differential.

The preferred embodiment is described relative to both FIGS. 2 and 3 for absolute and differential pressure measurement respectively. The purpose of the isolation diaphragm is to minimize deflections of the quartz diaphragms as the housing base is bowed due to the pressure differential between the capsule's internal reference pressure and the ambient pressure outside.

Figure 1:
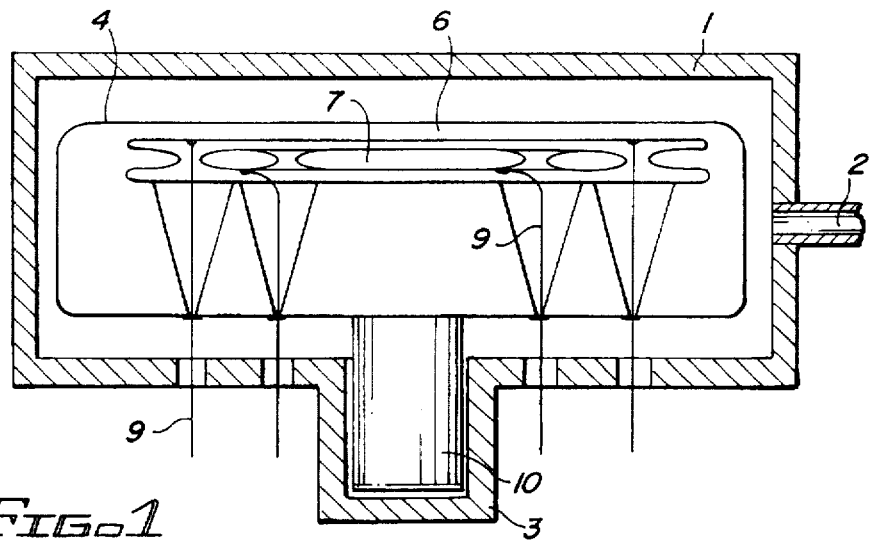
FIG. 1 is an elevational cross-sectional view of a prior art transducer.
Figure 4:
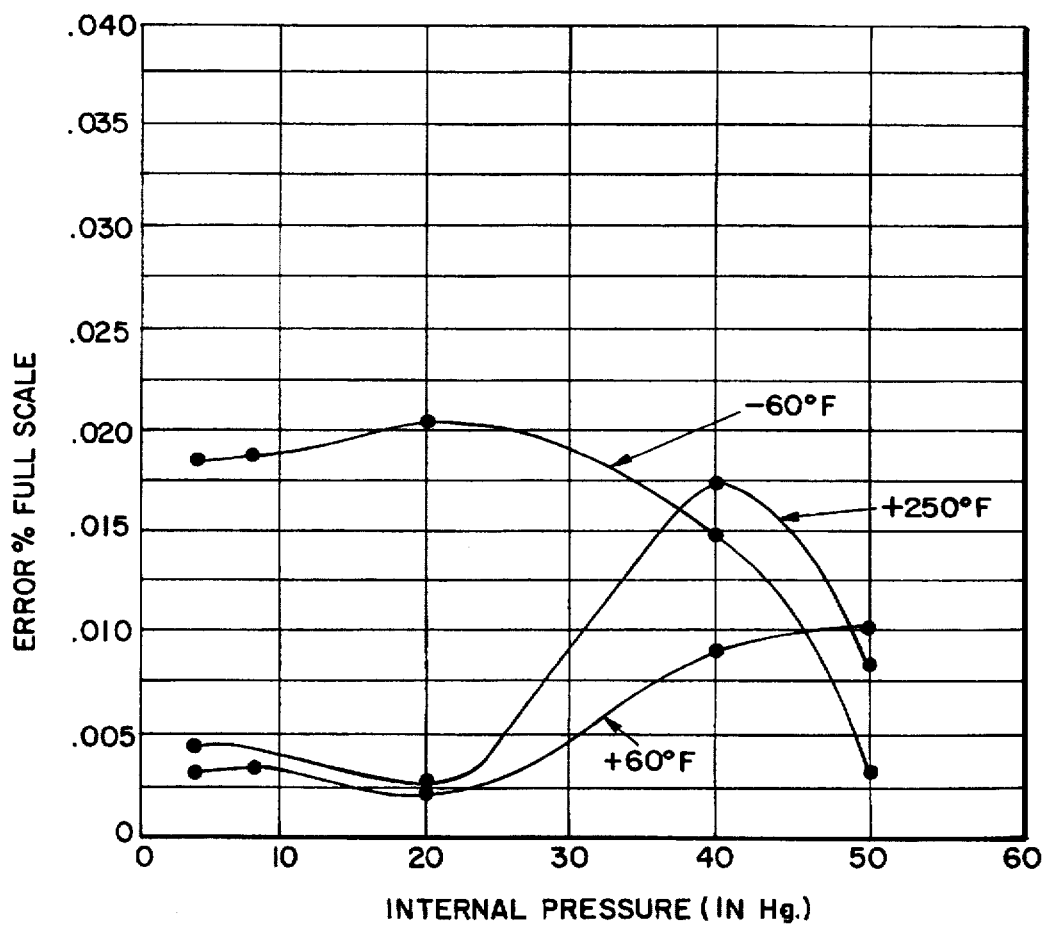
FIG. 4 is a graphical diagram of sensor performance error vs. case pressure.

The performance of a quartz capsule with an isolation diaphragm mount is given in FIG. 4. The largest error was at −60° F. when the case pressure was changed from 2 in Hg to 30 in Hg. Additional optimization of the isolation diaphragm thickness and laser weld or diffusion bonding has reduced this error even more.

It is again noted that the present invention includes an isolation diaphragm installed on one side of the sensor, thus to be used as the physical supporting surface. Deflections in the sensor's metal case housing (deflection proportional to difference in sample pressure being measured and ambient pressure) cause deflections in the sensor elements' supporting surface (the additional or isolation diaphragm or plate), but since the isolation diaphragm has a rather high compliance, there is little stress propagated into the rest of this sensor element. Thus, housing bowing causes the additional plate or isolation diaphragm to also bow, but this prevents bowing in the operative pressure and/or acceleration diaphragms. The isolation diaphragm also allows exit of the connecting wires without exposure to the sample pressure.

Note the term 'isolation diaphragm' as used herein does not refer to diaphragms that isolate the working pressure fluid from an internal sensor antiseptic fluid, but rather "isolation" or compensation for case deflections or bowing. That is, the present invention pertains to an additional compliant diaphragm added to the sensor through which mounting stresses are borne, but also through which the electrical connections are taken to preclude exposure of the connections to the working fluid.

Various modifications and alterations to the above described preferred embodiment will be also apparent to those skilled in the art. Accordingly, this description of the invention should be considered exemplary and not as limiting the scope and spirit of the invention as set forth in the following claims.

What is claimed is:

1. A pressure transducer comprising:

a housing;

a capsule disposed in said housing and spaced therefrom, said capsule comprising:

a first diaphragm having a first electrode on one side thereof, a second diaphragm having a second electrode on a first side facing said first electrode, said first and second diaphragms fused at their periphery to define a first space therebetween;

a support member disposed on the side of said second diaphragm opposite said first diaphragm, said support member and said second diaphragm fused at their periphery to define a second space therebetween; and an isolation diaphragm disposed on the side of said support member opposite said second diaphragm, said support member and said isolation diaphragm fused at their periphery to define a third space therebetween.

2. The pressure transducer of claim 1 wherein said capsule sits on a layer of a resilient silicone material disposed in said housing.

3. The pressure transducer of claim 1 wherein said first diaphragm, said second diaphragm; said support member, and said isolation diaphragm are made of quartz.

4. The pressure transducer of claim 1 wherein said first diaphragm, said second diaphragm; said support member, and said isolation diaphragm are made of aluminosilicate.

5. The pressure transducer of claim 1 wherein said first diaphragm, said second diaphragm; said support member, and said isolation diaphragm have a circular configuration.

6. The pressure transducer of claim 1 wherein said first and second electrode each comprise a thin film of a noble metal.

7. The pressure transducer of claim 6 wherein said first electrode has a ground shield on its surface opposite that having said first electrode.

8. The pressure transducer of claim 7 wherein said second electrode has a ground shield on its surface opposite that having said second electrode.

9. The pressure transducer of claim 1 wherein said pressure transducer is configured to measure an absolute pressure.

10. The pressure transducer of claim 1 wherein said pressure transducer is configured to measure a differential pressure.

* * * * *